Oct. 9, 1945.  T. D. GREEN  2,386,455
LIQUID SPRAY DISCHARGE APPARATUS FOR AND METHOD OF COOLING
THE INTERIOR OF BOTTLES AND OTHER HOLLOW GLASS ARTICLES
Filed June 5, 1942
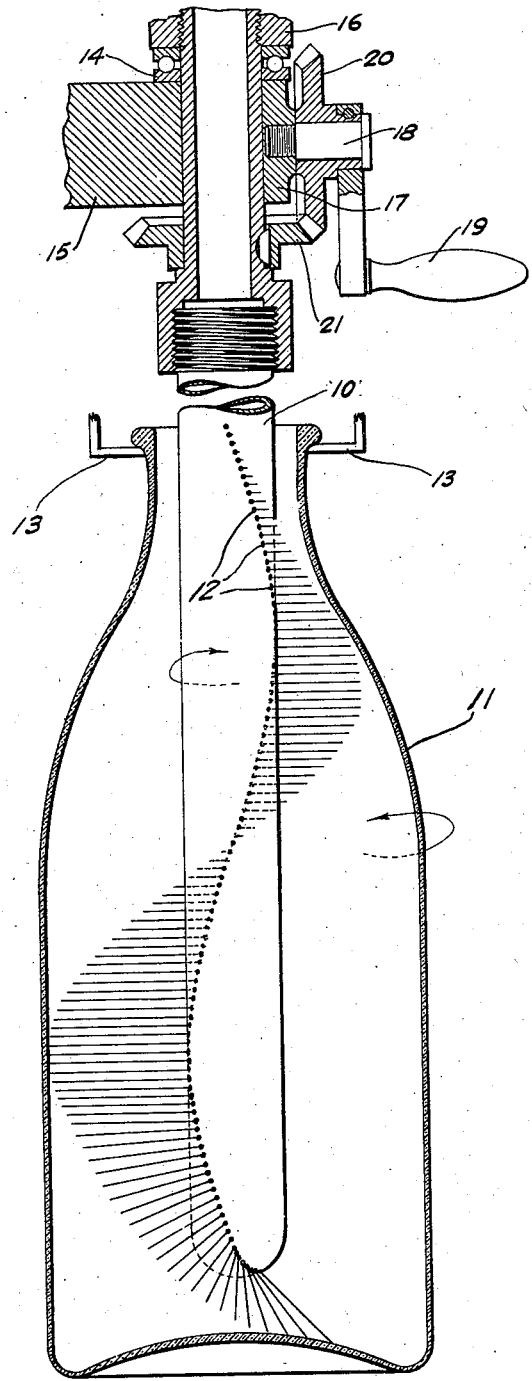
Inventor
Thomas D. Green
By Brown & Parham
Attorneys
Witness Patented Oct. 9, 1945

2,386,455

UNITED STATES PATENT OFFICE 2,386,455

LIQUID SPRAY DISCHARGE APPARATUS FOR AND METHOD OF COOLING THE INTERIOR OF BOTTLES AND OTHER HOLLOW GLASS ARTICLES

Thomas D. Green, West Hartford, Conn., assignor to Hartford-Empire Company, Hartford, Conn., a corporation of Delaware Application June 5, 1942, Serial No. 445,914

6 Claims. (Cl. 49—45)

The present invention relates to improvements in apparatus for and methods of applying a cooling fluid to the interior of bottles, jars and other hollow glass articles, especially when the coolant employed comprises liquid spray and the cooling operation is to effect tempering of the glass articles.

It has been proposed to use liquid spray mixed with air or other gaseous fluid as a coolant to be applied to glassware in an operation intended to effect tempering of the glassware. When the glassware to be tempered is a bottle, jar or other glass article, the application of the coolant to the internal surface thereof is governed by limitations arising from the shape or contour of such an article and the necessity or desirability of using a multi-apertured nozzle projecting into the article through an opening, usually relatively small, at one end of the article to effect distributed application of the cooling fluid to the inner wall of the article over the entire surface thereof. The proposal to use liquid spray as or in the fluid coolant presents difficulties beyond those encountered when air or other gaseous fluid alone is to be used. One of such difficulties arises from the fact that the liquid applied to the interior of the bottle or other glass article that is to be tempered tends to accumulate to an undesirable extent at the inner surface of the glass article.

An object of the present invention is to apply a coolant containing or consisting of liquid spray to the internal wall of a bottle, jar or other hollow glass article so that the tendency of some of the liquid to accumulate in an undesirably large mass at the inner surface of the article is substantially overcome or obviated.

A further object of the invention is to provide an effective means for and way of applying a coolant containing or consisting of liquid spray to the interior of an upright bottle, jar or other hollow glass article so as to impel or drive out unvaporized liquid from the interior of the article through the open upper end thereof.

To attain the foregoing and other objects of the invention, I may provide a nozzle adapted to depend through the open neck end of an upright bottle or other hollow glass article into the interior thereof toward the bottom of the article to the level desired together with means for supporting and operating the glass article and the nozzle to cause a relative rotation between them around the axis of the nozzle. The nozzle may be provided with jet holes which have been laid out, according to the present invention, along a helical or spiral line. When there is appropriate relative rotation between the glass article and this nozzle, the jets of liquid spray discharged therefrom against the inner surface of the article will not only effect the desired cooling of such surface but will impart to liquid on that surface movement in an upward direction so that such liquid finally will be impelled or driven out of the article through the open upper end thereof.

An illustrative practical embodiment of the invention is shown in the accompanying drawing, in which:

The view is a vertical section of a supported upright glass article to be tempered and an elevation of a rotatably supported nozzle depending into such article to operative position therein, the jet holes in the wall of the nozzle having been laid out along a spiral line as previously described.

In the apparatus shown, a nozzle 10 depends into a bottle 11 centrally of the latter to a level adjacent to but above the bottom of the bottle. The nozzle may be closed at its lower end. It is provided in the portion thereof within the bottle with jet holes 12 which are located in spaced apart relation in a series extending spirally of the nozzle. The uppermost jet hole may be located at a level suitable to discharge coolant against the interior of the upper neck portion of the bottle at or adjacent to the mouth thereof and the lowermost jet hole or jet holes may be suitably located to discharge a jet or jets of coolant against the bottom and lower corner portions of the inner wall of the bottle. These jet holes, their total number, size or sizes, and the spacing therebetween may be varied to satisfy different service requirements.

The bottle and the nozzle may be supported by any suitable supporting and operating mechanism. Such apparatus includes tongs, represented on the present drawing by the fragmentary portions of tong members 13.

The means for supporting the nozzle and for rotating it about its longitudinal axis may be represented by the simple form of mechanism shown in the drawing. The drawing shows the nozzle body to be supported above the level of the bottle by a thrust bearing 14 on a support 15. A collar 16 may be secured on the nozzle body to rest upon the bearing 14 of the support 15 to prevent downward axial movement of the nozzle relative to such support. The latter may have a portion 17 to which a short shaft 18 is secured. The shaft 18 carries at one end a manually operable crank 19 connected with a beveled gear 20 in mesh with a beveled gear 21 on the nozzle body 10. In actual practice, the mechanism employed to support and operate the nozzle probably would be automatic in its action.

The nozzle body may be rotated about its vertical axis in the direction of the arrow 22, which is counter-clockwise in the example shown. The bottle may be kept stationary, assuming rotation of the nozzle. If, however, the bottle should be rotated, the direction of rotation thereof should be clockwise when the jet holes of the nozzle are located along a line that extends spirally of the nozzle body in a counterclockwise direction when viewed from a level above that of the uppermost jet hole.

The nozzle 10 may be supplied at its interior with a coolant containing or consisting of a liquid spray. This may be done by any suitable means.

In operation, jets of a suitable coolant containing or consisting of liquid spray supplied to and discharging from the jet holes of the nozzle will form what may be termed a thin continuous atomized liquid vane extending spirally around the nozzle and radially between such nozzle and the inner wall of the bottle. The liquid at the outer edge of this spiral vane will spread or "mushroom" on striking the wall of the bottle. The relative rotation between the bottle and this thin spiral atomized liquid vane or series of jets from the nozzle will cause an upward impulse or lift to be imparted to the liquid on the inner wall of the glass article at the upper side of the contact edge of the thin spiral vane of liquid spray. In other words, the relative rotation between the nozzle and the bottle and the pitch and direction of the spirally extending atomized liquid vane or series of jets impinging against the inner wall of the bottle and functioning as a screw propeller will bias or impel liquid on the inner wall of the bottle upward toward and finally through the open upper end of the bottle. Cooling of the inner wall of the bottle, as through a suitable tempering temperature range, thus may be effected without causing or permitting the accumulation of liquid in an objectionably large mass at the inner wall of the shoulder or lower neck portion of the bottle. Such an accumulation of liquid at this place would effect undesirable localized chilling of this portion of the bottle wall to such an extent as probably to check and possibly to cause fracture thereof.

The jet holes in the nozzle may be formed so that the direction of each is perpendicular to the longitudinal axis of the nozzle body or the directions thereof may be such that all will direct their respective jets against the adjacent portions of the inner wall of the bottle in directions approximately normal to such portions of the bottle wall. In the latter case, the several jets or some of them may be inclined from the horizontal more or less according to the angular relation of the adjacent portions of the inner wall of the bottle to the vertical axis of such bottle. In such an arrangement the upwardly inclined jets will promote emigration of liquid upwardly from the bottle.

The invention may be advantageously employed in the cooling of the internal surface of a bottle or other hollow glass article when such article is in an upright position, as shown or in an inverted or any other suitable position for internal cooling.

I claim:

1. In apparatus for tempering hollow glass articles, an elongate nozzle having jet holes suitable for the discharge therefrom of jets of a fluid comprising liquid spray, said jet holes being arranged in a series extending spirally around the nozzle, and means for supporting said nozzle in a pendant vertical position and a hollow glass article to be tempered in an upright position with the portion of the nozzle provided with said jet holes depending within the glass article and for causing relative rotation between the nozzle and the glass article about the axis of the nozzle and of such a character that the jets from the jet holes sweep around the inner surface of the glass article in the same direction around the axis of the nozzle as that of the spiral of the series of jet holes as viewed from a level above the jet holes.

2. In apparatus for tempering hollow glass articles, an elongate nozzle having jet holes suitable for the discharge therefrom of jets of a fluid comprising liquid spray, said jet holes being arranged in a series extending spirally around the nozzle, and means for supporting said nozzle in a pendant vertical position and a hollow glass article to be tempered in an upright position with the portion of the nozzle provided with said jet holes depending within the glass article and for rotating the nozzle about its vertical axis relative to the glass article in the same direction as the spiral direction of the series of jet holes as viewed from a level above said jet holes.

3. The method of cooling the internal surface of an open-ended hollow glass article, which comprises supporting said article in an upright position with its open end uppermost, supporting an elongate nozzle having a spirally extending series of jet holes in its wall in position to depend within the hollow article centrally thereof, discharging a fluid comprising liquid spray through said jet holes so as to produce in effect a spirally extending vane of such fluid between the nozzle and the internal surface of the glass article, and causing a relative rotation between said nozzle and said glass article to cause said spirally extending vane to sweep around said internal surface of the article in the direction to exert a lifting action at its outer edge on liquid on said surface above said edge and thereby to impel such liquid upwardly from the interior of said article so as to prevent accumulation of excess liquid on said surface.

4. The method of cooling the internal surface of an open-ended hollow glass article, which comprises supporting said article in an upright position with its open end uppermost, discharging a cooling fluid comprising liquid spray against the internal surface of said article in a series of jets directed outwardly from spaced points along a line extending spirally around the vertical axis of the article, and causing a relative rotation between all of said jets in unison and said article around said vertical axis in the direction of the spiral direction of said line around the same axis as viewed from a level above said jets.

5. In apparatus for tempering hollow glass articles, an elongate nozzle having jet holes suitable for the discharge therefrom of a fluid comprising liquid spray, said jet holes being arranged in a series extending spirally around the nozzle, and means for supporting said nozzle and an open-ended hollow glass article to be tempered in such relative positions that the nozzle projects into the glass article and for causing relative rotation between the nozzle and the glass article of such a character that the jets from the jet holes sweep around the inner surface of the glass article in the same direction around the axis of the nozzle as that of the spiral of the series of jet holes as viewed from the open end of the glass article.

6. The method of cooling the internal surface of an open-ended hollow glass article, which comprises discharging a cooling fluid comprising liquid spray against the internal surface of said article in a series of jets directed outwardly from spaced points along a line extending spirally around the longitudinal axis of the article, and causing a relative rotation between all of said jets in unison and said article around said longitudinal axis in the same direction as that of the spiral of said series of jets as viewed from the open end of the article.

THOMAS D. GREEN.